(12) United States Patent
Patel et al.

(10) Patent No.: US 9,064,436 B1
(45) Date of Patent: *Jun. 23, 2015

(54) TEXT INPUT ON TOUCH SENSITIVE INTERFACE

(75) Inventors: Nirmal Patel, Mountain View, CA (US); Thad Eugene Starner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 315 days.

This patent is subject to a terminal disclaimer.

(21) Appl. No.: 13/590,968

(22) Filed: Aug. 21, 2012

Related U.S. Application Data

(60) Provisional application No. 61/584,083, filed on Jan. 6, 2012.

(51) Int. Cl.
*G09G 5/00* (2006.01)
*G03H 1/00* (2006.01)

(52) U.S. Cl.
CPC ... *G09G 5/00* (2013.01); *G03H 1/00* (2013.01)

(58) Field of Classification Search
CPC ....... G06F 1/163; G06F 3/013; G02B 27/017; G09G 5/00; G03H 1/00
USPC .............................. 345/7–9, 173–174; 359/13
See application file for complete search history.

(56) References Cited

U.S. PATENT DOCUMENTS

| 5,128,672 | A | 7/1992 | Kaehler |
| 7,250,938 | B2 | 7/2007 | Kirkland et al. |
| 7,251,367 | B2 | 7/2007 | Zhai |
| 7,895,518 | B2 | 2/2011 | Kristensson |
| 7,920,132 | B2 | 4/2011 | Longe et al. |
| 8,059,101 | B2 | 11/2011 | Westerman et al. |

(Continued)

FOREIGN PATENT DOCUMENTS

| EP | 1 933 225 A2 | 6/2008 |
| WO | 97/18547 A1 | 5/1997 |

OTHER PUBLICATIONS

Goodisman, A stylus-based user interface for text : entry and editing, Massachusetts Institute of Technology, Dept. of Electrical Engineering and Computer Science, May 1991, http://www.bitsavers.org/pdf/xerox/parc/techReports/CSL-91-10_A_Stylus-Based_User_Interface_for_Text_Entry_and_Editing.pdf.

(Continued)

*Primary Examiner* — Lun-Yi Lao
*Assistant Examiner* — Jarurat Suteerawongsa
(74) *Attorney, Agent, or Firm* — McDonnell, Boehnen, Hulbert & Berghoff LLP

(57) ABSTRACT

Methods and systems for text input are provided. In one example, a head-mountable device (HMD) having a touch interface may be configured to receive touch inputs from a user to enter text. The touch interface may include input areas corresponding to characters. The HMD may be configured to determine characters and words the user wishes to enter according to different touch inputs, including land inputs, lift inputs, flick inputs, drag inputs, tap inputs, and scratch inputs. In one case, the HMD may determine subsets of characters for each letter in a word the user wishes to enter, and determine the word the user wishes to enter according to the subsets of characters. In another case, the HMD may determine a vector array corresponding to the word the user wishes to enter, and determine the word the user wishes to enter by comparing the vector array against word vector templates.

20 Claims, 10 Drawing Sheets

(56) References Cited

U.S. PATENT DOCUMENTS

| | | |
|---|---|---|
| 8,147,154 B2 | 4/2012 | Jawerth et al. |
| 8,584,049 B1 | 11/2013 | Zhai et al. |
| 8,701,050 B1 | 4/2014 | Starner et al. |
| 2004/0140956 A1 | 7/2004 | Kushler et al. |
| 2005/0114115 A1 | 5/2005 | Karidis et al. |
| 2007/0040813 A1 | 2/2007 | Kushler et al. |
| 2008/0100579 A1* | 5/2008 | Robinson et al. ............ 345/168 |
| 2008/0169998 A1 | 7/2008 | Jacobsen et al. |
| 2010/0214267 A1 | 8/2010 | Radivojevic et al. |
| 2011/0194029 A1* | 8/2011 | Herrmann et al. ............ 348/569 |
| 2012/0081305 A1* | 4/2012 | Schrock ........................ 345/173 |

OTHER PUBLICATIONS

Shape Writer (previously known as Shorthand-Aided Rapid Keyboarding (SHARK)); Last modified on May 4, 2012 at 03:13; http://www.ask.com/wiki/ShapeWriter.

ShapeWriter (previously known as Shorthand-Aided Rapid Keyboarding (SHARK)); From Wikipedia, the free encyclopedia; http://en.wikipedia.org/wiki/ShapeWriter.

* cited by examiner

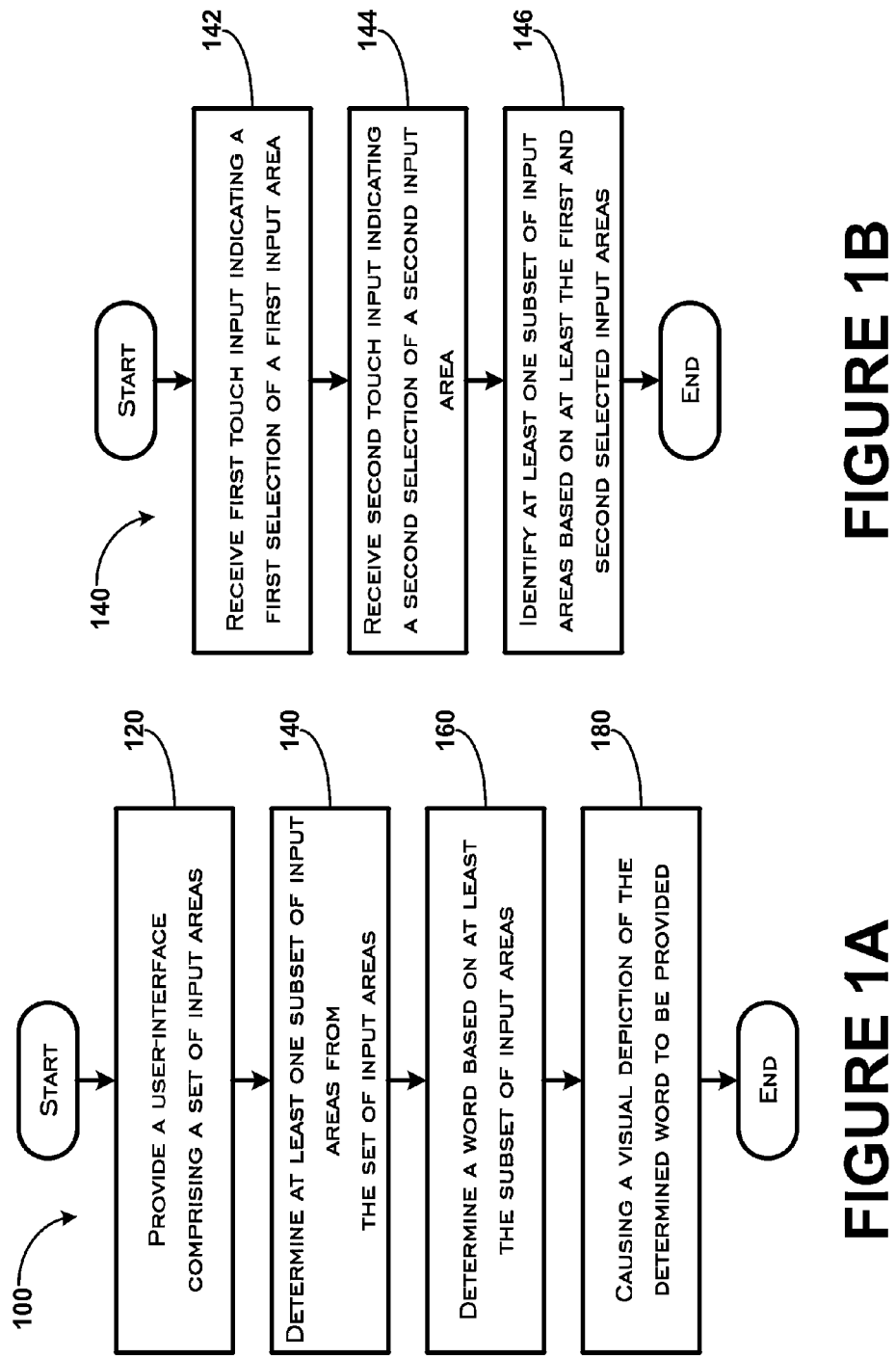

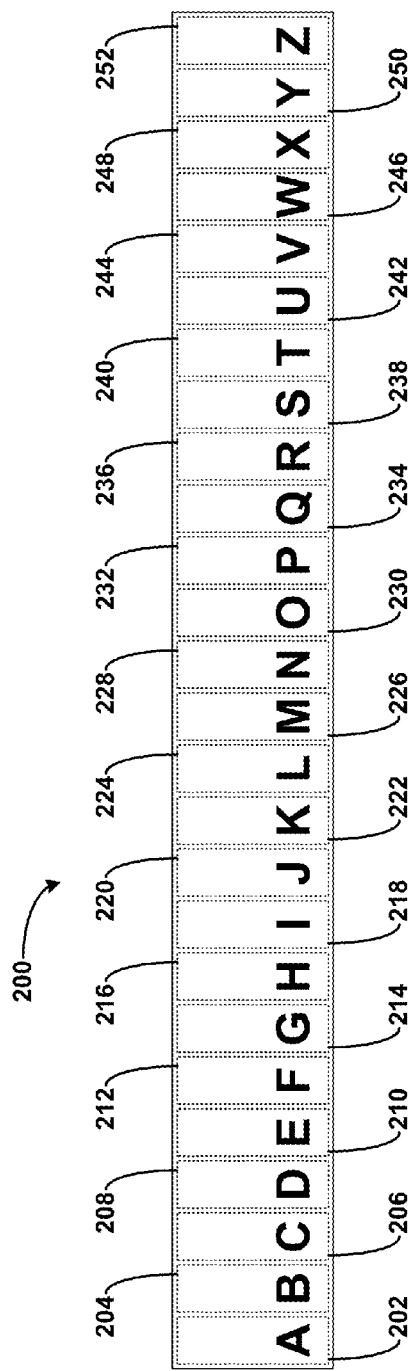
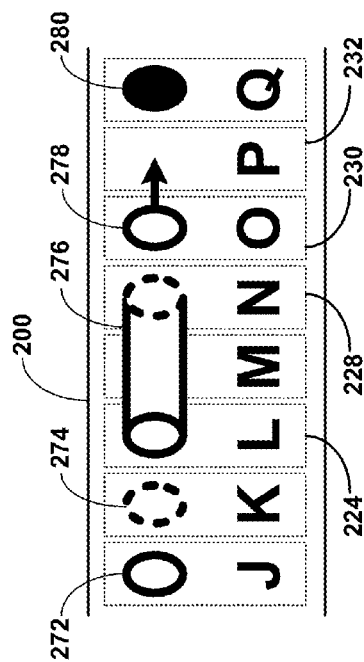
FIGURE 2A
FIGURE 2B

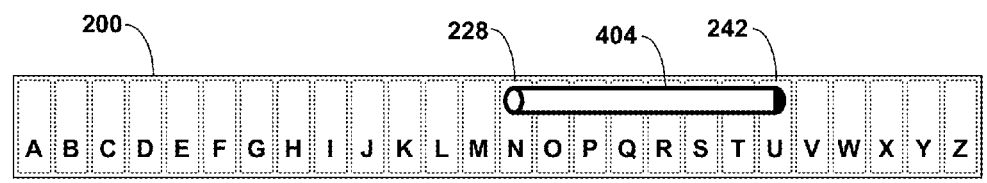
Character 1: O – U
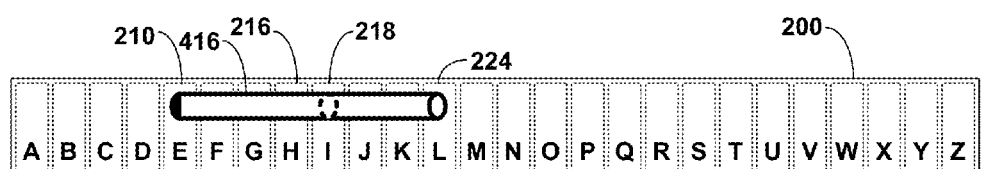
Character 2: F – I
FIGURE 4

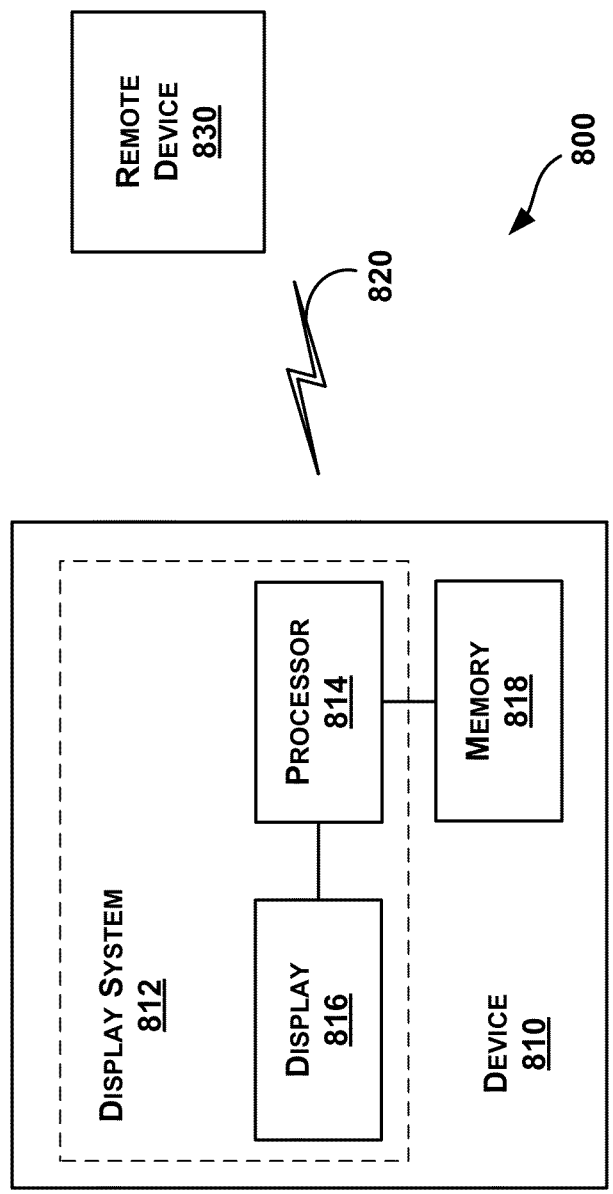

TEXT INPUT ON TOUCH SENSITIVE INTERFACE

CROSS-REFERENCE TO RELATED APPLICATION

The present application claims priority to U.S. Provisional Application Ser. No. 61/584,083, filed on Jan. 6, 2012, the entire contents of which are incorporated by reference.

BACKGROUND

Unless otherwise indicated herein, the materials described in this section are not prior art to the claims in this application and are not admitted to be prior art by inclusion in this section.

Computing systems such as personal computers, laptop computers, tablet computers, cellular phones, among many other types of computing systems, are increasingly prevalent in numerous aspects of modern life. As computers become progressively more integrated with users' everyday life, the convenience, efficiency, and intuitiveness of the user-interfaces by which users interact with computing devices becomes progressively more important.

A user-interface may include various combinations of hardware and software which enable the user to, among other things, interact with a computing system. One example of a modern user-interface is a "pointing device" that may allow a user to input spatial data into a computing system. The spatial data may be received and processed by the computing system, and may ultimately be used by the computing system as a basis for executing certain computing functions.

One type of pointing device may, generally, be based on a user touching a surface. Examples of common such pointing devices include a touchpad and a touch screen. Other examples of pointing devices based on a user touching a surface may exist as well. In some arrangements, the surface is a flat surface that can detect contact with the user's finger. For example, the surface may include electrode-sensors, capacitive sensors, resistive sensors, and/or other sensors that are arranged to transmit, to the computing system, data that indicates the pressure and direction of movement of the finger on the surface.

The computing system may be equipped with a graphical display that may, for example, provide a visual depiction of a graphical pointer that moves in accordance with the movement of the pointer. The graphical display may also provide a visual depiction of other objects that the user may manipulate, including, for example, a visual depiction of a graphical user-interface. The user may refer to such a graphical user-interface when inputting data. Implementations of a touchpad may involve a graphical display that is physically remote from the touchpad. However, a touchscreen is typically characterized by a touchpad embedded into a graphical display such that users may interact directly with a visual depiction of the graphical user-interface, and/or other elements displayed on the graphical display, by touching the graphical display itself.

User-interfaces may be arranged to provide various combinations of keys, buttons, and/or, more generally, input regions. Often, user-interfaces will include input regions that are associated with multiple characters and/or computing commands. Typically, users may select various characters and/or various computing commands, by performing various input actions on the user-interface.

However, often users must carry out complex and burdensome input procedures to select characters and/or computing commands. As a result, known methods for selecting characters and/or computing commands using such user-interfaces are often considered inconvenient, inefficient, and/or non-intuitive.

SUMMARY

The systems and methods described herein may help to provide for more convenient, efficient, and/or intuitive selection of characters via a touch-based user-interface.

In one example, a system with at least one processor and a non-transitory computer readable medium is provided. Program instructions may be stored on the non-transitory computer readable medium and may be executable by the at least one processor to perform functions. The functions may include providing a user-interface having a set of input areas. Each of the input areas may be associated with a character from a set of characters. The functions may also include determining at least one subset of input areas from the set of input areas. Determining the at least one subset of input areas may include receiving first touch input data indicating a first selection of a first input area from the set of input areas, and receiving second touch input indicating a second selection of a second input area from the set of input areas. The second input area may be in a given direction relative to the first input area. Determining the at least one subset of input areas may further include identifying the at least one subset of input areas based on at least (i) the first and second selected input areas and (ii) the given direction relative to the first input area. The functions may further include determining a word based on at least the at least one determined subset of input areas, and causing a visual depiction of the determined word to be provided on a graphical display.

In another example, a method is provided that includes providing a user-interface having a set of input areas. Each of the input areas may be associated with a character from a set of characters. The method may also include determining at least one subset of input areas from the set of input areas. Determining the at least one subset of input areas may include receiving first touch input data indicating a first selection of a first input area from the set of input areas, and receiving second touch input indicating a second selection of a second input area from the set of input areas. The second input area may be in a given direction relative to the first input area. Determining the at least one subset of input areas may further include identifying the at least one subset of input areas based on at least (i) the first and second selected input areas and (ii) the given direction relative to the first input area. The method may further include determining a word based on at least the at least one determined subset of input areas, and causing a visual depiction of the determined word to be provided on a graphical display.

In yet another example, a computer readable memory with instructions stored thereon is provided. The instructions may be executable by a computing device to cause the computing device to execute functions. The functions may include providing a user-interface having a set of input areas. Each of the input areas may be associated with a character from a set of characters. The functions may also include determining at least one subset of input areas from the set of input areas. Determining the at least one subset of input areas may include receiving first touch input data indicating a first selection of a first input area from the set of input areas, and receiving second touch input indicating a second selection of a second input area from the set of input areas. The second input area may be in a given direction relative to the first input area. Determining the at least one subset of input areas may further include identifying the at least one subset of input areas based on at least (i) the first and second selected input areas and (ii) the given direction relative to the first input area. The functions may further include determining a word based on at least the at least one determined subset of input areas, and causing a visual depiction of the determined word to be provided on a graphical display.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 1A illustrates a block diagram of an example method for text input.

FIG. 1B illustrates a block diagram of an example method for determining at least one subset of input areas.

FIG. 2A illustrates an example touch interface including input areas corresponding to characters of the English alphabet.

FIG. 2B illustrates different types of touch inputs on an example touch interface.

FIG. 4 illustrates a second series of example touch inputs for entering the word.

FIG. 8 illustrates a simplified block diagram of an example computer network infrastructure.

DETAILED DESCRIPTION

Figure 3:
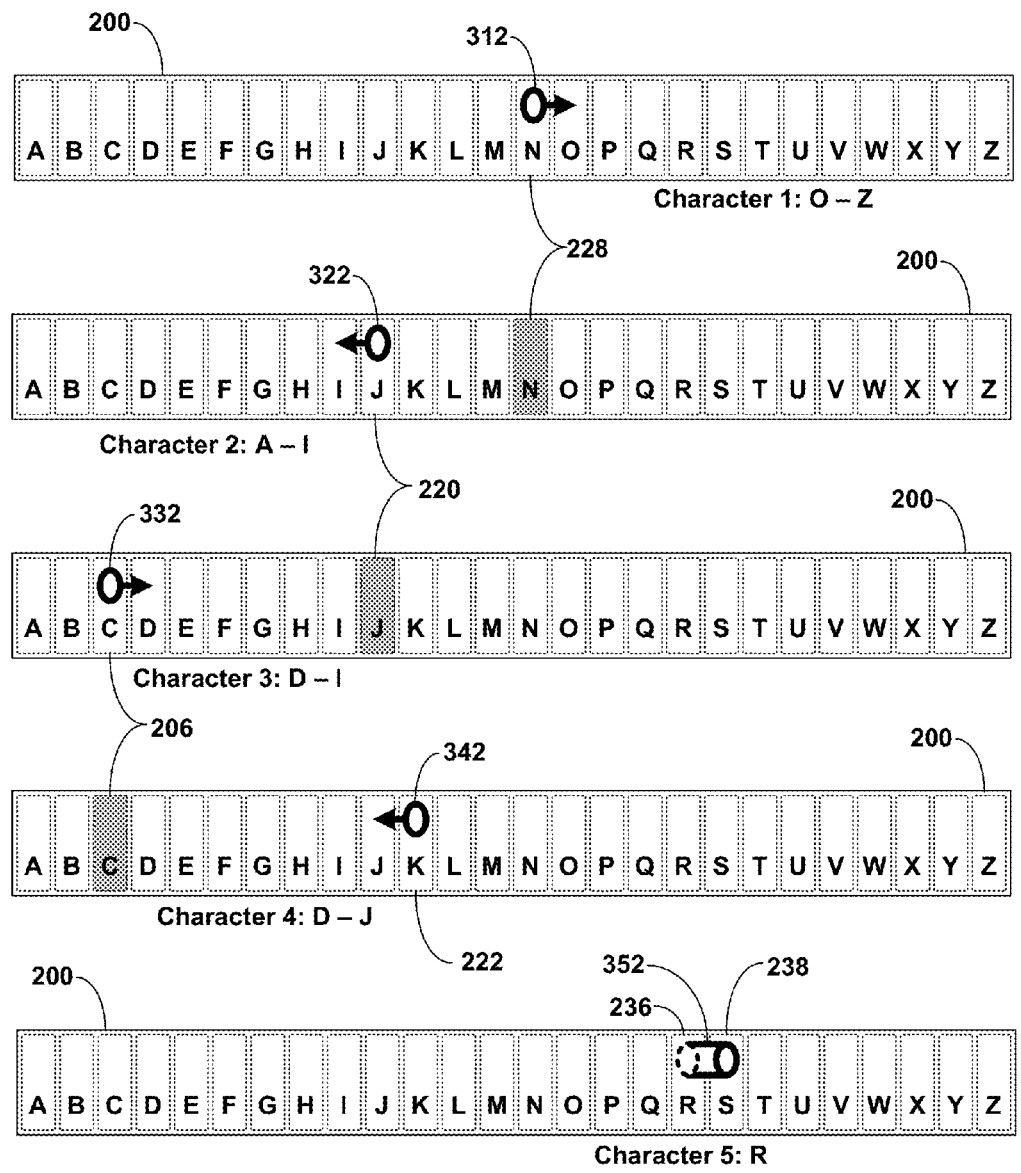
FIG. 3 illustrates a first series of example touch inputs for entering a word.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein. Further, other embodiments may be utilized, and other changes may be made, without departing from the scope of the subject matter presented herein.

1. Overview

In an example scenario, a user wearing a head-mountable device (HMD) may be interacting with a computing device, or a person accessing the computing device, by entering text using the HMD. The user may be entering text for the purpose of providing commands or inputs to the computing device, or for purposes of communicating with the person. In one case, the HMD may include a touch interface configured to receive touch inputs corresponding to text inputs. Additional information relating to the HMD, and how the HMD may capture signals representing an experience, can be found below in connection with FIGS. 6-9.

In one case, the touch interface of the HMD may have input areas corresponding to characters, and touch inputs received at the input areas may cause the respective corresponding characters to be entered. As such, the user may enter words by entering each character of the word. Each character of the word may be entered by providing a touch input at an input area corresponding to the character. In some instances, if the touch input is not initially provided at the input area corresponding to the character the user wishes to enter, the user may drag the touch input to the input area corresponding to the character the user wishes to enter before entering the character.

Rather than relying on the user to provide a touch input at a correct input area for each character of a word, however, the computing system may determine the word the user wishes to enter based on, for example, locations of touch inputs, touch input types, and distances between touch inputs. In some cases, implementation of the method on the HMD may result in faster and more intuitive entering of text by the user wearing the HMD. Implementation of the method may also allow the user to enter text correctly without requiring visual feedback from the HMD (for instance visual feedback indicating each character the user has entered), thereby allowing for "blind text input."

While examples described herein may refer specifically to the use of an HMD with a touch interface, those skilled in the art will appreciate that any computing device may be configured to execute the methods described herein to achieve desired results.

2. Example Blind Text Input Method

FIG. 1A is a block diagram of an exemplary method 100 for blind text input, according to one embodiment of the present disclosure. Method 100 may include one or more operations, functions, or actions as illustrated by one or more of blocks 120-180. Block 120 involves providing a user-interface including a set of input areas. Block 140 involves determining at least one subset of input areas from the set of input areas on the user-interface. Block 160 involves determining a word based on at least the determined subset of input areas. And block 180 involves causing a visual depiction of the determined word to be provided.

Although the blocks are illustrated in a sequential order, these blocks may also be performed in parallel, and/or in a different order than those described herein. Also, the various blocks may be combined into fewer blocks, divided into additional blocks, and/or removed, depending upon the desired implementation.

In addition, for the method 100 and other processes and methods disclosed herein, the flowchart shows functionality and operation of one possible implementation of the present disclosure. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive, as described later in FIGS. 8 and 9. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

At block 120, the method 100 involves providing a user-interface including a set of input areas. In one case, the input areas may be associated with a character from a set of characters. FIG. 2A illustrates an example touch interface 200 including input areas corresponding to characters of the English alphabet. As shown, the touch interface 200 includes input areas 202-252, each corresponding to a character in the English alphabet. In this example, the input areas 202-252 may be configured to correspond to respective characters according to the order of characters in the alphabet. In other examples, different arrangements of input areas may be configured according to different arrangements of characters. For instance, the input areas 202-252 may be arranged in the form of a "qwerty" keyboard and accordingly, the input areas 202-252 may correspond to characters arranged in a manner of the "qwerty" keyboard.

In addition to characters from the English alphabet, the set of characters may also include punctuations and other symbols. Further, additional input areas may be provided and configured for switching between upper and lower cases of the characters.

In one case, the touch interface 200 may be implemented on an extending side-arm of an HMD, such as a touch sensitive interface 682 discussed below in connection to FIG. 6C. As such, a user may be able to access the touch interface 200 on the extending side-arm of the HMD, while wearing the HMD.

At block 140, the method 100 involves determining at least one subset of input areas from the set of input areas. FIG. 1B is a block diagram of steps corresponding to block 140, which involves determining at least one subset of input areas, according to one embodiment of the present disclosure. Method 140 may include one or more operations, functions, or actions as illustrated by one or more of blocks 142-146. Block 142 involves receiving a first touch input indicating a first selection of a first input area. Block 144 involves receiving a second touch input indicating a second selection of a second input area. And block 146 involves identifying at least one subset of input areas based on at least the first and second selected input areas.

Although the blocks are illustrated in a sequential order, these blocks may be performed in parallel, and/or in a different order than those described herein. Also, the various blocks may be combined into fewer blocks, divided into additional blocks, and/or removed, depending upon the desired implementation.

At block 142, the method 140 involves receiving first touch input data indicating a first selection of a first input area from the set of input areas. The first touch input data may be received from a user touching a touch interface such as the touch interface 200. The first touch input data may indicate the first selection of the first input area based on a type of touch input the user may provide.

FIG. 2B illustrates different types of touch inputs for an example touch interface. As shown on a subset of input areas of the touch interface 200, the different types of touch inputs may include a land input 272, a lift input 274, a drag input 276, and flick input 278, and a dwell input 280. In one example, the land input 272 may indicate a touch engagement with the touch interface 200. In another example, the lift input 274 may indicate a touch disengagement from the user-interface. In yet another example, the drag input 276 may indicate continuous engagement between two input areas. As shown, the drag input 276 may be preceded by a land input on input area 224, and end with a lift input on input area 228, with the drag input 276 being between the input areas 224 and 228. In a further example, the flick input 278 may indicate a directional disengagement from the user-interface. As shown, the directional disengagement of the flick input 278 on input area 230 is in the direction of input area 232. In this case, the flick input 278 may also be preceded by a land input on input area 230. In yet a further example, the dwell input 280 may indicate a stationary touch engagement of a given duration with the touch interface 200. In the following discussions referencing the touch interface 200 of FIG. 2A, "forward" refers to a direction towards input area 252, and "backward" refers to a direction towards input area 202.

Referring back to FIG. 1B, block 144 of the method 140 involves receiving second touch input indicating a second selection of a second input area from the set of input areas. In one case, the second input area may be in a given direction relative to the first input area. Similar to the first touch input, the second touch input may indicate the second selection of the second input area based on a type of touch input the user may provide. The types of touch input the user may provide may also include the land input 272, the lift input 274, the drag input 276, the flick input 278, and the dwell input 280, as described above in connection to FIG. 2B.

At block 146, the method 140 involves identifying the at least one subset of input areas based on at least the first and second selected input areas. The first and second selected input areas may represent a single input area, a pair of input areas, or a range of input areas, depending on the type of touch inputs and how the HMD may be configured. In one case, identifying the at least one subset of input areas may also be based on the given direction relative to the first input area.

In one example, the first touch input received at the first input area may be a land input. In one case, if the second touch input received at the second input area is a lift input, and the first and second input areas are the same, then the at least one subset of input areas may be the first and second input areas, which are the same in this case. Referring to FIG. 2A, if the first touch input is a land input on input area 204, and the second touch input is a lift input on input area 204, then the at least one subset of input areas may be input area 204. This series of touch inputs may also be referred to as a tap input.

In another case, the second touch input received at the second input area may also be a lift input, while the second input area may be different from the first input area. In one instance, the at least one subset of input areas may include the input areas located between the first and second input areas. Referring to FIG. 2A, if the first touch input is a land input on input area 204, and the second touch input is a lift input on input area 232, then the at least one subset of input areas may include input areas 206-230. In this instance, the at least one subset of input areas may or may not include the first or second input areas. As such, the at least one subset of input areas may or may not include input areas 204 or 232.

In another instance, the at least one subset of input areas may include all available input areas in the direction of the second input area, starting from the first input area. Continuing with the previous example, the at least one subset of input areas may include input areas 204 (or 205)-252. Again in this instance, the at least one subset of input areas may or may not include the first input area. As such, the at least one subset of input areas may or may not include input area 204.

In another example, the first touch input received at the first input area may be a land input, and the second touch input may be a flick input received at the second input area, which may be an input area adjacent to the first input area. In this case, the at least one subset of input areas may include all available input areas in the direction of the second input area. Referring to FIG. 2A, the first touch input may be a land input on input area 208, and the second touch input may be a flick input at the input area 210, adjacent to input areas 208. In other words, the flick input may be a forward flick. As such, the at least one subset of input areas may include available input areas in the direction of input area 210 relative to input area 208, including input areas 210-252. In this case, the at least one subset of input areas may or may not include the first input area. Accordingly, the at least one subset of input areas may or may not include input area 208.

In addition to the first and second touch input data indicating first and second selections of first and second input areas, the method 140 may further involve receiving third touch input data indicating a third selection of a third input area from the set of input areas. In this case, determining the at least one subset of input areas may also be based on the third input area.

In one example, the first touch input may be a land input at the first input area, the second touch input may be a drag input received over the second input area, and the third touch input may be a lift input at the third input area. In one case, the second input area may include a range of input areas. In this case, the at least one subset of input areas may include the range of input areas included in the second input area. Referring to FIG. 2A, the first touch input may be a land input at input area 212, the second touch input may be a drag input over input areas 214-234, and the third touch input may be a lift input at input area 236. In other words, the second touch input may be a forward drag. As such, the at least one subset of input areas may include input areas 214-234. In this instance, the at least one subset of input areas may or may not include the first input area. Accordingly, the at least one subset of input areas may or may not include input areas 212 or 236. As discussed, determining the at least one subset of input areas may be based on at least the first and second selected input areas, and the first, second, and third selected input areas.

While the above discussions refer to a flick input as having two touch inputs indicating selections of two input areas, flick inputs may be considered as a single touch input indicating a range of input areas. Similarly, a drag input may be considered a single touch input or a pair of touch inputs indicating a range of input areas. Determination of how the different types of touch inputs are evaluated by the computing system may depend on different implementations of the method 100 and configurations of user touch interfaces such as the touch interface 200.

Referring back to FIG. 1A, block 160 of the method 100 involves determining a word based on at least the at least one determined subset of input areas. As discussed above, each of the input areas correspond to a character. As such, the at least one determined subset of input areas represent a subset of characters that, one of which the user may wish to type to form a character of a word the user wishes to type. Accordingly, the word may be determined based on the at least one determined subset of characters in a number of ways. The examples discussed herein are intended as a sample of the different methods and considerations that may be implemented to determine a word based on a determined subset of characters, and therefore should not be taken to be limiting.

In one case, a probability for each character in the subset of characters may be determined according to a prevalence of each character in commonly used words. In another case, the probability for each character may be assigned based on distances between the locations of the corresponding input areas and where a land input is provided. In this case, the probability assigned to a character having a corresponding input area near the input area where the land input is provided may be higher than the probability assigned to a character having a corresponding input area far from the input area where the land input is provided. In yet another case, the probability for each character may be assigned based on context. For example, if a preceding character is a letter "q," then the current character may more likely be a letter "u" than a letter "i." In a further case, the probability for each character may be determined based on a combination of any or each of the above.

Whichever the case, the word may be determined based at least in part on the probabilities of the characters in the subset of characters. In addition, probabilities of words which have characters in the determined subset of characters may also be considered. In one case, the probabilities of words may be determined based on occurrence probabilities of words which have characters in the subset of characters. In another case, the probabilities of words may also be based on context. For example, if a preceding word is a noun, then the current word may more likely be a verb than another noun.

In one case, the word may be determined once the subsets of characters have been determined for each character of the word the user wishes to enter. This may be based on the user providing an input indicating that the user has completed entering the word. In another case, the word may be determined after each subset of characters has been determined. In such a case, a refined word may be provided after a subsequent subset of characters has been determined.

In this case, the method 100 may involve receiving third touch input data indicating a third selection of a third input area from the set of input areas. In one case, identifying the at least one subset of input areas may be based on at least (i) the first and second selected input areas, and (ii) the first, second, and third input areas. In another case, a refined-subset of input areas may be identified based on at least the second and third selected input areas. In one instance, the third touch input data indicating the third selection of the third input area may further define, and thereby refine the at least one determined subset of input areas. In other words, the refined-subset of input areas may be a subset of the at least one determined subset of input areas. The refined word may then be determined based on at least the at least one determined subset of input areas and the refined subset of input areas. In some cases, the refined word may be the same as the previously determined word.

At block 180, the method 100 involves causing a visual depiction of the determined word to be provided on a graphical display. The graphical display may be similar to a display 708 discussed below in connection to FIG. 7B. In one example, the visual depiction of the determined word may be provided to the user to prompt the user to either accept the determined word or reject the determined word. In the case the word may be determined after each subset of characters has been determined, the visual depiction of the determined word may be updated with the refined word each time a refined word is determined. In some cases, more than one word may be determined. In these cases, each of the determined words may be provided on the graphical display for the user to select. In such cases, each of the determined words may be provided on the graphical display in an order according to factors such as a prevalence or a context associated with each of the words.

3. Example Blind Text Input Scenarios

According to methods 100 and 140 discussed above, other methods for determining words the user wishes to enter may be implemented based on specific configurations of touch input types. Below are two blind text input methods based on specific configurations of touch input types, described through text input scenarios.

a. Blind Flick/Scratch Text Input

One method may be implemented based on flick and drag touch inputs. FIG. 3 illustrates a first series of example touch inputs for entering a word THEIR. As shown, the series of example touch inputs are provided on touch interface 200 and include flick inputs 312, 322, and 342, and a drag input 352. As shown, the flick input 312 provided by the user may land on input area 228 corresponding to the letter N and include a forward flick, indicating that the first letter is in the range of O-Z.

The next letter in the word is H. As such, the user may then attempt to land somewhere before input area 228 corresponding to the letter N. As shown, the flick input 322 provided by the user may land on input area 220 corresponding to the letter J and include a backward flick, indicating that the second letter is in the range of A-I.

The next letter in the word is E. As such, the user may attempt to land somewhere before input area 220 corresponding to the letter J. As shown, the flick input 332 provided by the user may land on input area 206 corresponding to the letter C and include a forward flick. In this case, input area 206 corresponding to the letter C is before input area 220 corresponding to the letter J, indicating the user moved backward from the letter J to provide the flick input 332. As such, the third letter may be determined to be in the range of D-I, rather than D-Z.

The next letter in the word is I. As such, the user may attempt to land somewhere after input area 206 corresponding to the letter C. As shown, the flick input 342 provided by the user may land on input area 222 corresponding to the letter k and include a backward flick. Similar to the case discussed above in reference to the third letter, the fourth letter may be determined to be in the range of D-J rather than A-J.

The last letter in the word is R. As such, the user may attempt to land somewhere after input area 228 corresponding to the letter N, and where flick input 312 was provided. As shown, the drag input 352 may land on input area 238 corresponding to the letter S and lift from input area 236 corresponding to the letter R. In another case, the user may land on the input area 238 corresponding to the letter S and flick backward such that the fifth letter may be determined to be in the range of O-R. However, because the input area 236 corresponding to the letter R is adjacent to the input area 238 corresponding to the letter S, the user may decide to provide a drag input to the input area 236 corresponding to the letter R, and lifting from the input area 236 corresponding to the letter R to indicate that the fifth letter is R. This series of inputs including a drag input toward and a lift input from an input area corresponding to the letter the user wishes to enter may be referred to as a "scratch."

Accordingly, the subset of characters for each letter in the word the user wishes to enter has been determined. As discussed above, the first letter is in the range O-Z, the second letter is in the range A-I, the third letter is in the range D-I, the fourth letter is in the range D-J and the fifth letter is R. Based on these ranges, a dictionary of words may be used to determine a five-lettered word or list of five-lettered words having letters meeting the corresponding subset of characters. The determined word or list of words may then be provided for the user to accept or select. Alternatively, the most-likely intended word from the list of words may be automatically selected.

The first blind text input method discussed above in connection to FIG. 3 may also incorporate drag inputs in addition to the drag input 352. Rather than providing a flick input in the direction of the letter the user wishes to enter, the user may provide a drag input in the direction of the letter the user wishes to enter and passing the letter. If the provided drag input passes the letter the user wishes to enter by a relatively small margin, the user may "scratch" over the letter to indicate that the user wishes to enter the letter, as discussed above in connection to the drag input 352 and the fifth letter R.

In one case, if the user does not provide a "scratch" input, a drag trace of the drag input may be recorded, and a range of characters corresponding to input areas covered by the drag trace may be determined as the subset of characters. FIG. 4 illustrates a second series of example touch inputs for entering the first two letters of the word THEIR using the touch interface 200. As shown, a drag input 404 is provided from input area 228 corresponding to the letter N to input area 242 corresponding to the letter U. Based on a drag trace of the drag input 404, the first letter of the word the user wishes to enter is in the range of O-U. In addition, a probability may be assigned to each letter in the range of O-U based on distances between the corresponding input areas and where the drag trace ends. In other words, because the user provided a drag input in the direction of the letter the user wishes to enter and passing the letter, the letter the user wishes to enter may be nearer the end of the drag trace than the beginning. As such, a ranking of probabilities of letters in the range of O-U may be determined by back-tracking along the drag trace. Accordingly, the ranking of the probabilities of letters in the range of O-U may indicate that the letter U has the highest probability of being the letter the user wishes to enter, followed by T, S and so on.

To enter the second letter H, the user may land on input area 224 corresponding to the letter L and provide a drag input 416 towards input area 216 corresponding to the letter H. However, the drag input 416 may overshoot input area 216 corresponding to the letter H substantially. In this case, the user may provide the drag input 416 back towards the input area 216 corresponding to the letter H. As such, the drag trace starts at input area 224 corresponding to the letter L and ends at input area 218 corresponding to the letter I, passing through all input areas between input area 224 corresponding to the letter L and input area 210 corresponding to the letter E.

As with the case above in reference to the first letter T, a probability may be assigned to each letter in the range of E-L based on distances between the corresponding input areas and where the drag trace ends. In this case, the end of the drag trace is in the middle of the range of E-L, and a ranking of the probabilities of letters in the range of E-L determined based on back-tracking the drag trace may indicate that the letter I has the highest probability of being the letter the user wishes to enter, followed by H, G, F, E, J, K, and finally L.

b. Blind Tap Text Input

Another blind text input method may be implemented based on tap inputs. Note that while this second method may be implemented based on tap inputs, drag inputs and scratch inputs may also be incorporated, as with the blind flick/scratch text input method described previously.

Figure 5A:
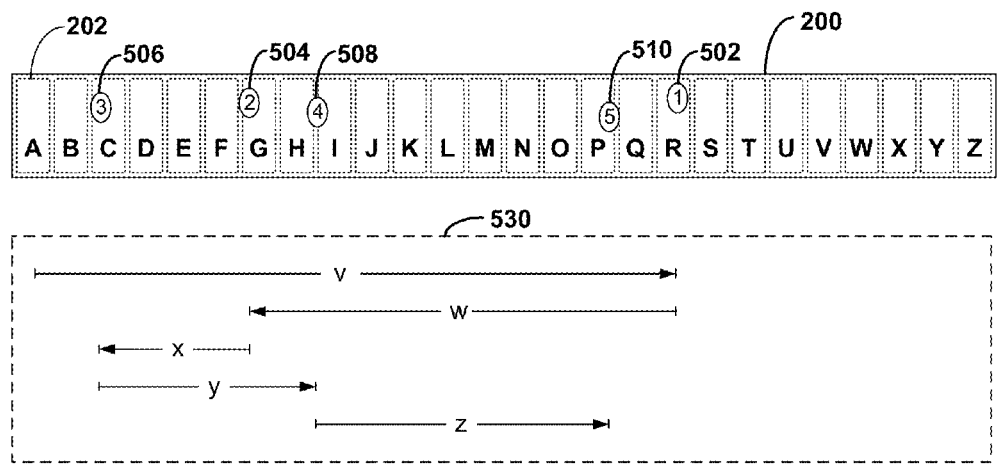
FIG. 5A illustrates a third series of example touch inputs for entering the word.

The blind tap text input method includes generating an array of tap input vectors and comparing the array of tap input vectors against a plurality of word vector templates. Each of the plurality of word vector templates corresponds to a word. FIG. 5A illustrates a series of touch inputs provided by a user intending to enter the word THEIR on the touch interface 200. As shown, a series of tap inputs 502, 504, 506, 508, and 510 may be provided by a user. As the user provides each tap input, an input-vector array 530 may be generated.

For each tap input, a vector specifying a direction and a distance between the given tap input and a previous tap input may be generated. In one case, in which the tap input is the first of a series of tap inputs, the direction and distance may be determined in reference to a reference point. The reference point may provide a relative location from where the first vector is generated. The reference point may be any predetermined location on the touch interface, so long as a same reference point is used for the plurality of word vector templates. In another case, the first of a series of tap inputs may be determined as the reference point. In such a case, the first vector of each word vector template, may be considered the reference point for the given word vector template when comparing the tap input vectors against the word vector templates.

In one example, the reference point may be the input area 202, corresponding to the letter A. As shown, the first tap input 502 is at a location which is a distance v, in a forward direction from the reference point. As such, a first vector indicating a forward distance of v may be added to the input-vector array 530.

Next, the second tap input 504 is at a location which is a distance w, in a backward direction from the location of the first tap input 502. As such, a second vector indicating a backward distance of w may be added to the input-vector array 530.

Next, the third tap input 506 is at a location which is a distance x, in a backward direction from the location of the second tap input 504. As such, a third vector indicating a backward distance of x may be added to the input-vector array 530.

Next, the fourth tap input 508 is at a location which is a distance y, in a forward direction from the location of the third tap input 506. As such, a fourth vector indicating a forward distance of y may be added to the input-vector array 530.

Finally, the fifth tap input 510 is at a location which is a distance z, in a forward direction from the location of the fourth tap input 508. As such, a fifth vector indicating a forward distance of z may be added to the input-vector array 530.

Note that in this case, due to the use of a predetermined reference point, the input-vector array 530 may include five vectors for five tap inputs. In other words, the input-vector array 530 may have a number of vectors matching the number of tap inputs. In the case that the first tap input is used as the reference point, the input-vector array 530 may include only four vectors for five tap inputs. In this case, the input-vector array 530 may have a number of vectors one less than the number tap inputs.

Once the input-vector array 530 has been generated, the vectors in the input-vector array 530 may be modified or scaled to account for human factors. For instance, the perceived distance between two tap inputs by the user may not be linear as may be the case with the configuration of input areas on the touch interface 200. In fact, the distance perceived by the user may be different from the actual distance on the touch interface 200 by a logarithmic factor. As such, the distance components of each input vector in the input-vector array may be modified by a logarithmic factor such that the input vectors may better represent the distances between each tap input, as intended by the user. On the other hand, the plurality of word vector templates may be modified or scaled by an inverse logarithmic factor to adapt the linear distances between input areas of the touch interface 200 to better match the distances between input areas as perceived by the user.

Figure 5B:
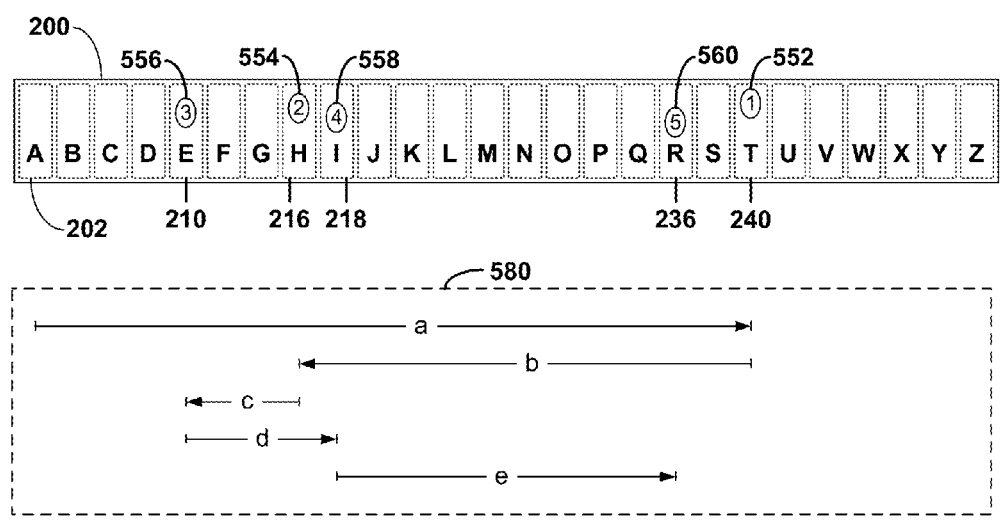
FIG. 5B illustrates an example template for a word.

Once the input-vector array 530 has been modified or scaled to account for human factors, the input-vector array 540 may be compared against a word vector template. FIG. 5B illustrates an example word vector template 580 for the word THEIR. As shown, the word vector template 580 includes vectors indicating distances and directions between accurate and precise tap inputs 552, 554, 556, 558, and 560 for entering the word THEIR. The first tap input 552 is located on input area 240, a forward distance of a from the reference point, which is the location of input area 202, corresponding to the letter A. The second tap input 554 is located on input area 216, a backward distance b from the location of the first tap input 552 at input area 240. The third tap input 556 is located on input area 210, a backward distance c from the location of the second tap input 554 at input area 216. The fourth tap input 558 is located on input area 218, a forward distance d from the location of the third tap input 556 at input area 210. Finally, the fifth tap input 560 is located on input area 236, a forward distance e from the location of the fourth tap input 558 at input area 218.

The input-vector array 530 may be compared to the plurality of word vector templates such as the word vector template 580 based on various algorithms. For instance, the differences between distances and directions for each corresponding vector may be determined and averaged. In other words, when comparing the input-vector array 530 against the word vector template 580, the distances between vectors a and v, b and w, c and x, d and y, and e and z may be averaged to determine a similarity score between the input-vector array 530 and the word vector template 580.

In addition to determining similarity scores between the input-vector array 530 and the plurality of word vector templates, occurrence probabilities of the words corresponding to the word vector templates may also be considered. For instance, the similarity score between the input-vector array 530 and a word vector template for the word PECHO may be higher than the similarity score between the input-vector array 530 and the word vector template for the word THEIR. In this case, THEIR may be a more commonly used word than PECHO, and may therefore be determined as the word the user wishes to enter rather than PECHO. Similarly, context, including parts of speech may also be considered when determining the word the user wishes to enter. In some cases, any word corresponding to a word vector template having a similarity score above a predetermined threshold value may be provided for the user to select.

In the above example, the input-vector array 530 is compared against the plurality of word vector templates after each tap input to enter the word THEIR has been provided by the user. In a further example, the input-vector array 530 may be compared against the plurality of word vector templates starting when the first tap input has been provided by the user. For example, after tap inputs 502 and 504 have been provided, the input-vector array 530 which may only have two input vectors may be compared against the first two input vectors of each word vector template in the plurality of word vector templates. In this case, word vector templates starting with two vectors in forward directions may be eliminated because having two vectors in forward directions indicate that the input area corresponding to the second character is after input area corresponding to the first character, while the first two vectors in the input-vector array 530 indicate that the input area corresponding to the second character is before the input area corresponding to the first letter.

After receiving the third tap input, the input-vector array 530, now with three vectors, may be compared against the first three vectors of the remaining plurality of word vector templates that have not already been eliminated based on the first two vectors. Comparison between the input-vector array 530 and word vector templates from the plurality of word vector templates may become more computationally intensive due to the increased number of vectors being compared. In this case however, the input-vector array 530 may be compared against fewer word vector templates from the plurality of word vector templates as the number of vectors being compared increases. As a result, the computational requirements for determining relatively long words may be curbed.

4. Example System and Device Architecture

Figure 6A:
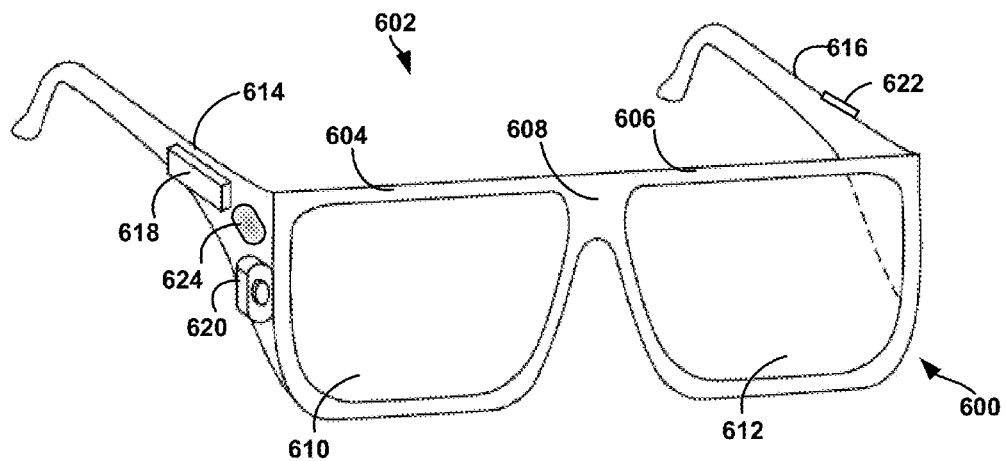
FIG. 6A illustrates an example system for receiving, transmitting, and displaying data.

FIG. 6A illustrates an example system 600 for receiving, transmitting, and displaying data. The system 600 is shown in the form of a wearable computing device, which may be implemented as the HMD discussed above, for receiving touch input data. While FIG. 6A illustrates a head-mountable device 602 as an example of a wearable computing device, other types of wearable computing devices could additionally or alternatively be used. As illustrated in FIG. 6A, the head-mountable device 602 has frame elements including lens-frames 604, 606 and a center frame support 608, lens elements 610, 612, and extending side-arms 614, 616. The center frame support 608 and the extending side-arms 614, 616 are configured to secure the head-mountable device 602 to a user's face via a user's nose and ears, respectively.

Each of the frame elements 604, 606, and 608 and the extending side-arms 614, 616 may be formed of a solid structure of plastic and/or metal, or may be formed of a hollow structure of similar material so as to allow wiring and component interconnects to be internally routed through the head-mountable device 602. Other materials may be possible as well.

One or more of each of the lens elements 610, 612 may be formed of any material that can suitably display a projected image or graphic. Each of the lens elements 610, 612 may also be sufficiently transparent to allow a user to see through the lens element. Combining these two features of the lens elements may facilitate an augmented reality or heads-up display where the projected image or graphic is superimposed over a real-world view as perceived by the user through the lens elements 610, 612.

The extending side-arms 614, 616 may each be projections that extend away from the lens-frames 604, 606, respectively, and may be positioned behind a user's ears to secure the head-mountable device 602 to the user. The extending side-arms 614, 616 may further secure the head-mountable device 602 to the user by extending around a rear portion of the user's head. Additionally or alternatively, for example, the system 600 may connect to or be affixed within a head-mountable helmet structure. Other possibilities exist as well.

The system 600 may also include an on-board computing system 618, a video camera 620, a sensor 622, and a finger-operable touch pad 624. The on-board computing system 618 is shown to be positioned on the extending side-arm 614 of the head-mountable device 602; however, the on-board computing system 618 may be provided on other parts of the head-mountable device 602 or may be positioned remote from the head-mountable device 602 (e.g., the on-board computing system 618 could be connected by wires or wirelessly connected to the head-mountable device 602). The on-board computing system 618 may include a processor and memory, for example. The on-board computing system 618 may be configured to receive and analyze data from the video camera 620, the sensor 622, and the finger-operable touch pad 624 (and possibly from other sensory devices, user-interfaces, or both) and generate images for output by the lens elements 610 and 612. The on-board computing system 618 may additionally include a speaker or a microphone for user input (not shown). An example computing system is further described below in connection with FIG. 7.

The video camera 620 is shown positioned on the extending side-arm 614 of the head-mountable device 602; however, the video camera 620 may be provided on other parts of the head-mountable device 602. The video camera 620 may be configured to capture images at various resolutions or at different frame rates. Video cameras with a small form-factor, such as those used in cell phones or webcams, for example, may be incorporated into an example embodiment of the system 600.

Further, although FIG. 6A illustrates one video camera 620, more video cameras may be used, and each may be configured to capture the same view, or to capture different views. For example, the video camera 620 may be forward facing to capture at least a portion of the real-world view perceived by the user. This forward facing image captured by the video camera 620 may then be used to generate an augmented reality where computer generated images appear to interact with the real-world view perceived by the user.

The sensor 622 is shown on the extending side-arm 616 of the head-mountable device 602; however, the sensor 622 may be positioned on other parts of the head-mountable device 602. The sensor 622 may include one or more of a gyroscope or an accelerometer, for example. Other sensing devices may be included within, or in addition to, the sensor 622 or other sensing functions may be performed by the sensor 622.

The finger-operable touch pad 624 is shown on the extending side-arm 614 of the head-mountable device 602. In this configuration, the touchpad 624 may be outside a field of view of a wearer of the system 600. However, the finger-operable touch pad 624 may be positioned on other parts of the head-mountable device 602. Also, more than one finger-operable touch pad may be present on the head-mountable device 602. The finger-operable touch pad 624 may be used by a user to input commands. The finger-operable touch pad 624 may sense at least one of a position and a movement of a finger via capacitive sensing, resistance sensing, or a surface acoustic wave process, among other possibilities. The finger-operable touch pad 624 may be capable of sensing finger movement in a direction parallel or planar to the pad surface, in a direction normal to the pad surface, or both, and may also be capable of sensing a level of pressure applied to the pad surface. The finger-operable touch pad 624 may be formed of one or more translucent or transparent insulating layers and one or more translucent or transparent conducting layers. Edges of the finger-operable touch pad 624 may be formed to have a raised, indented, or roughened surface, so as to provide tactile feedback to a user when the user's finger reaches the edge, or other area, of the finger-operable touch pad 624. If more than one finger-operable touch pad is present, each finger-operable touch pad may be operated independently, and may provide a different function.

Figure 6B:
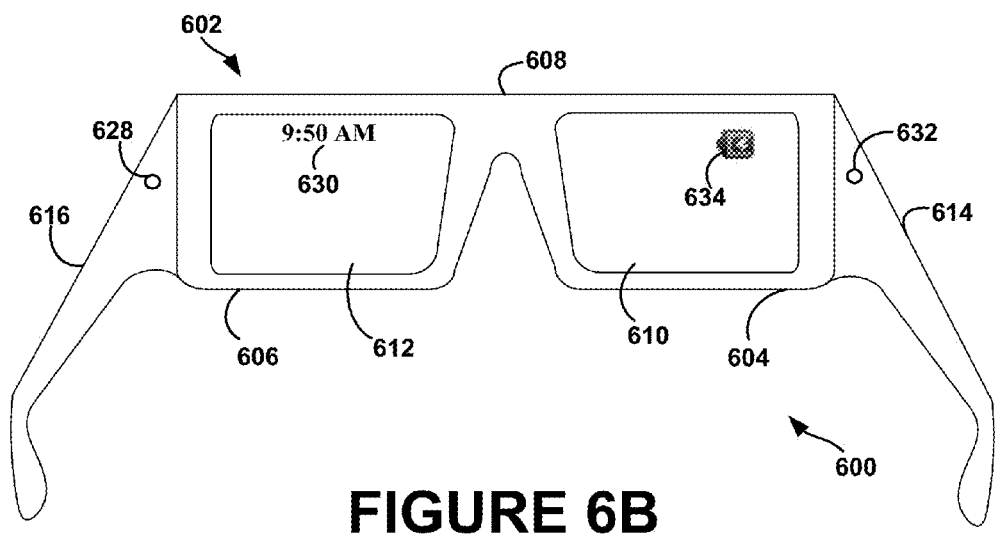
FIG. 6B illustrates an alternate view of the system illustrated in FIG. 5A.

FIG. 6B illustrates an alternate view of the system 600 illustrated in FIG. 6A. As shown in FIG. 6B, the lens elements 610, 612 may act as display elements. The head-mountable device 602 may include a first projector 628 coupled to an inside surface of the extending side-arm 616 and configured to project a display 630 onto an inside surface of the lens element 612. Additionally or alternatively, a second projector 632 may be coupled to an inside surface of the extending side-arm 614 and configured to project a display 634 onto an inside surface of the lens element 610.

The lens elements 610, 612 may act as a combiner in a light projection system and may include a coating that reflects the light projected onto them from the projectors 628, 632. In some embodiments, a reflective coating may be omitted (e.g., when the projectors 628, 632 are scanning laser devices).

In alternative embodiments, other types of display elements may also be used. For example, the lens elements 610, 612 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 604, 606 for driving such a matrix display. Alternatively or additionally, a laser or light emitting diode (LED) source and scanning system could be used to draw a raster display directly onto the retina of one or more of the user's eyes. Other possibilities exist as well.

Figure 6C:
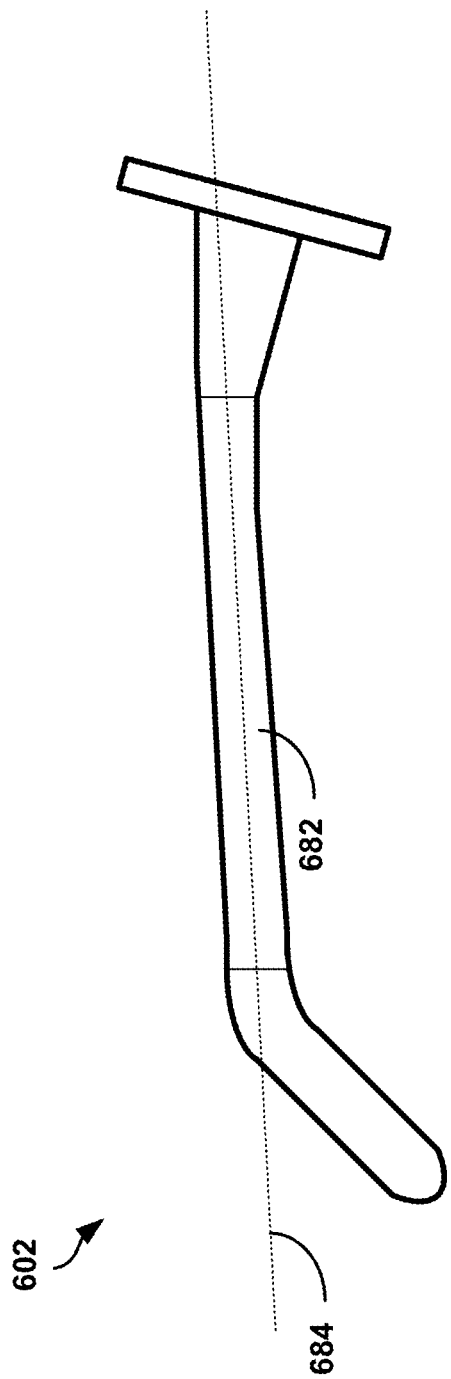
FIG. 6C illustrates an example system for receiving, transmitting, and displaying data.

FIG. 6C depicts another alternate view of another wearable computing system according to an example embodiment. More particularly, FIG. 6E depicts an alternate view of an extending side-arm. As shown, the extending side-arm is configured to include a touch sensitive interface 682, having a longitudinal axis 684, along the side arm. Touch sensitive interface 682 may be a finger-operable touch pad as described above. Generally, touch sensitive interface 682 may take on any suitable touch-based interface form including, for example, electrode-based, capacitance-based, and/or resistance-based forms, among others, similar to the finger-operable touch pad 624 shown in FIG. 6A.

Figure 7A:
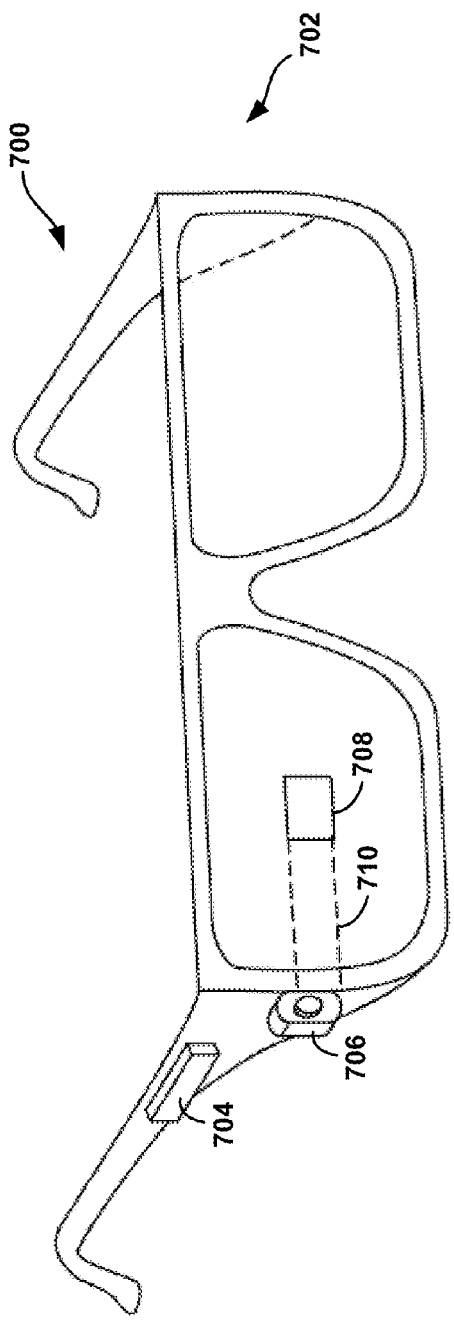
FIG. 7A illustrates another example system for receiving, transmitting, and displaying data.

FIG. 7A illustrates an example system 700 for receiving, transmitting, and displaying data. The system 700 is shown in the form of a wearable computing device 702, which may be implemented as the HMD discussed above, for receiving input data. The wearable computing device 702 may include frame elements and side-arms such as those described with respect to FIGS. 6A and 6B. The wearable computing device 702 may additionally include an on-board computing system 704 and a video camera 706, such as those described with respect to FIGS. 6A and 6B. The video camera 706 is shown mounted on a frame of the wearable computing device 702; however, the video camera 706 may be mounted at other positions as well.

As shown in FIG. 7A, the wearable computing device 702 may include a single display 708 which may be coupled to the device. The display 708 may be formed on one of the lens elements of the wearable computing device 702, such as a lens element described with respect to FIGS. 6A and 6B, and may be configured to overlay computer-generated graphics in the user's view of the physical world. The display 708 is shown to be provided in a center of a lens of the wearable computing device 702, however, the display 708 may be provided in other positions. The display 708 is controllable via the computing system 704 that is coupled to the display 708 via an optical waveguide 710.

Figure 7B:
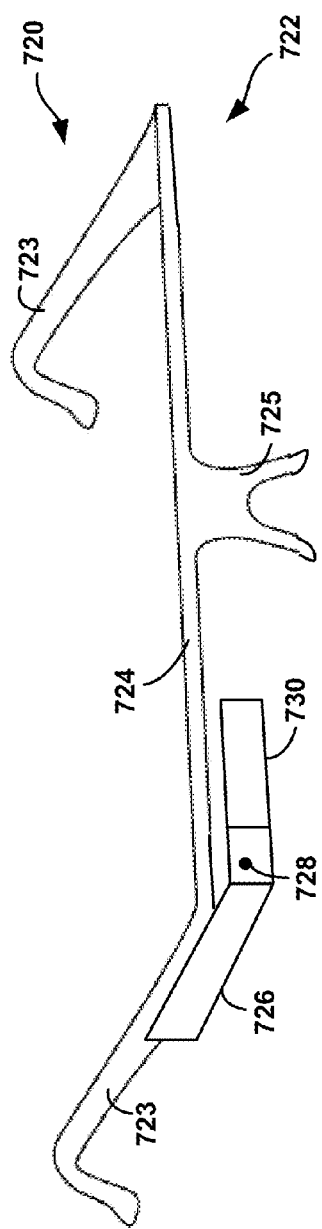
FIG. 7B illustrates yet another example system for receiving, transmitting, and displaying data.

FIG. 7B illustrates an example system 720 for receiving, transmitting, and displaying data. The system 720 is shown in the form of a wearable computing device 722. The wearable computing device 722 may include side-arms 723, a center frame support 724, and a bridge portion with nosepiece 725. In the example shown in FIG. 7B, the center frame support 724 connects the side-arms 723. The wearable computing device 722 does not include lens-frames containing lens elements. The wearable computing device 722 may additionally include an on-board computing system 726 and a video camera 728, such as those described with respect to FIGS. 6A and 6B.

The wearable computing device 722 may include a single lens element 730 that may be coupled to one of the side-arms 723 or the center frame support 724. The lens element 730 may include a display such as the display described with reference to FIGS. 6A and 6B, and may be configured to overlay computer-generated graphics upon the user's view of the physical world. In one example, the single lens element 730 may be coupled to a side of the extending side-arm 723. The single lens element 730 may be positioned in front of or proximate to a user's eye when the wearable computing device 722 is worn by a user. For example, the single lens element 730 may be positioned below the center frame support 724, as shown in FIG. 7B.

FIG. 8 shows a simplified block diagram of an example computer network infrastructure. In system 800, a device 810 communicates using a communication link 820 (e.g., a wired or wireless connection) to a remote device 830. The device 810 may be any type of device that can receive input data. For example, the device 810 may be a heads-up display system, such as the head-mountable device 602, 700, or 720 described with reference to FIGS. 6A-7B.

Thus, the device 810 may include a display system 812 including a processor 814 and a display 816. The display 816 may be, for example, an optical see-through display, an optical see-around display, or a video see-through display. The processor 814 may receive data from the remote device 830, and configure the data for display on the display 816. The processor 814 may be any type of processor, such as a microprocessor or a digital signal processor, for example.

The device 810 may further include on-board data storage, such as memory 818 coupled to the processor 814. The memory 818 may store software that can be accessed and executed by the processor 814, for example.

The remote device 830 may be any type of computing device or transmitter including a laptop computer, a mobile telephone, or tablet computing device, etc., that is configured to transmit data to the device 810. The remote device 830 and the device 810 may contain hardware to enable the communication link 820, such as processors, transmitters, receivers, antennas, etc.

In FIG. 8, the communication link 820 is illustrated as a wireless connection; however, wired connections may also be used. For example, the communication link 820 may be a wired serial bus such as a universal serial bus or a parallel bus, among other connections. The communication link 820 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Either of such a wired and/or wireless connection may be a proprietary connection as well. The remote device 830 may be accessible via the Internet and may include a computing cluster associated with a particular web service (e.g., social-networking, photo sharing, address book, etc.).

Figure 9:
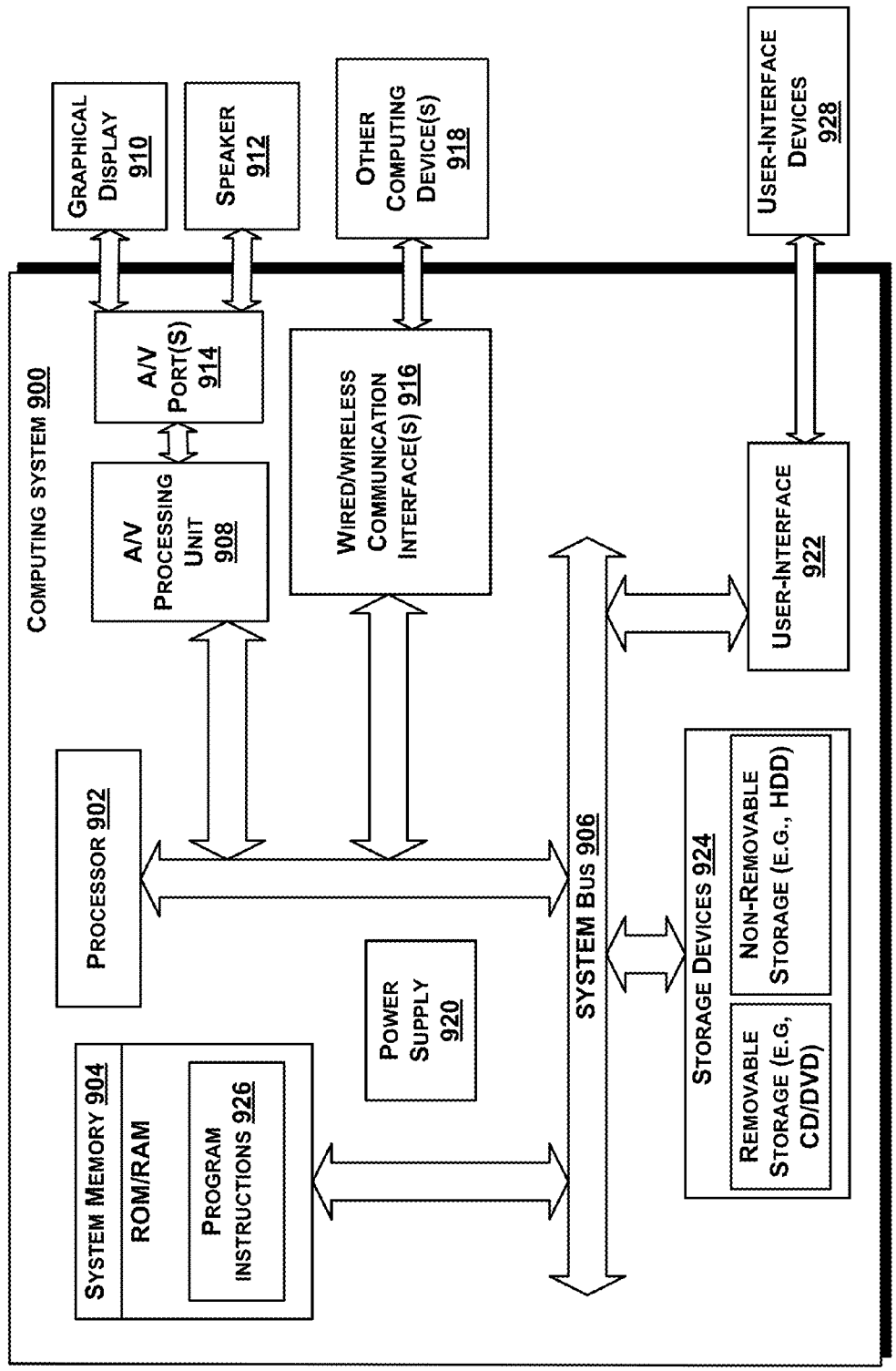
FIG. 9 illustrates a simplified block diagram depicting example components of an example computing system.

As described above in connection with FIGS. 6A-7B, an example wearable computing device may include, or may otherwise be communicatively coupled to, a computing system, such as computing system 618 or computing system 704. FIG. 9 shows a simplified block diagram depicting example components of an example computing system 900. One or both of the device 810 and the remote device 830 may take the form of computing system 900.

Computing system 900 may include at least one processor 902 and system memory 904. In an example embodiment, computing system 900 may include a system bus 906 that communicatively connects processor 902 and system memory 904, as well as other components of computing system 900. Depending on the desired configuration, processor 902 can be any type of processor including, but not limited to, a microprocessor (μP), a microcontroller (μC), a digital signal processor (DSP), or any combination thereof. Furthermore, system memory 904 can be of any type of memory now known or later developed including but not limited to volatile memory (such as RAM), non-volatile memory (such as ROM, flash memory, etc.) or any combination thereof.

An example computing system 900 may include various other components as well. For example, computing system 900 includes an A/V processing unit 908 for controlling graphical display 910 and speaker 912 (via A/V port 914), one or more communication interfaces 916 for connecting to other computing devices 918, and a power supply 920. Graphical display 910 may be arranged to provide a visual depiction of various input regions provided by user-interface module 922. For example, user-interface module 922 may be configured to provide a user-interface, and graphical display 910 may be configured to provide a visual depiction of the user-interface. User-interface module 922 may be further configured to receive data from and transmit data to (or be otherwise compatible with) one or more user-interface devices 928.

Furthermore, computing system 900 may also include one or more data storage devices 924, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 900.

According to an example embodiment, computing system 900 may include program instructions 926 that are stored in system memory 904 (and/or possibly in another data-storage medium) and executable by processor 902 to facilitate the various functions described herein including, but not limited to, those functions described with respect to FIG. 1. Although various components of computing system 900 are shown as distributed components, it should be understood that any of such components may be physically integrated and/or distributed according to the desired configuration of the computing system.

5. Conclusion

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense. Further, it is intended to be understood that the following clauses further describe aspects of the present description.

The invention claimed is:

1. A system comprising:
   at least one processor;
   a head-mountable display that provides a wearer field-of-view when worn;
   a touch interface arranged on the head-mountable display such that the touch interface is outside of the wearer field-of-view when the head-mountable display is worn;
   a non-transitory computer readable medium; and
   program instructions stored on the non-transitory computer readable medium and executable by the at least one processor to perform functions comprising:
   providing, on the touch interface, a user-interface comprising a set of input areas, wherein each of the input areas is associated with a character from a set of characters;
   receiving, on the touch interface, first touch input data indicating a selection of a first input area from the set of input areas and a direction relative to the first input area;
   determining a first subset of input areas from the set of input areas, wherein the first subset includes a range of one or more adjacent input areas extending from the selected first input area in the indicated direction relative to the selected first input area;

receiving, on the touch interface, second touch input data indicating a sequence of one or more successive selections of respective second input areas from the set of input areas and respective directions relative to each selected second input area, wherein each selected second input area is located to a first side of a previously selected second input area;

determining one or more second subsets of input areas from the set of input areas, wherein each second subset includes a range extending from the selected second input area in the indicated direction relative to the second input area, wherein the range is exclusive of input areas that are located to a second side of previously selected second input area, and wherein the second side is opposite the first side;

determining a word that includes respective characters corresponding to input areas within the first subset of input areas and the one or more second subsets of input areas; and causing a visual depiction of the determined word to be provided on a head-mountable graphical display.

2. The system of claim 1,
wherein receiving, on the touch interface, second touch input data indicating a sequence of one or more successive selections of respective second input areas comprises, for at least one of the one or more successive selections of second input areas, receiving data indicating a lift input upwards from a given second input area, and wherein the respective range consists of the given second input area.

3. The system of claim 1,
wherein the set of input areas extends linearly between two terminating input areas, and wherein receiving, on the touch interface, second touch input data indicating a sequence of one or more successive selections of respective second input areas comprises, for at least one of the one or more successive selections of second input areas, receiving data indicating a flick input towards a given terminating input area of the of the set of input areas, wherein the respective range consists of one or more second input areas between the selected second input area and the terminating input area.

4. The system of claim 1,
wherein receiving, on the touch interface, second touch input data indicating a sequence of one or more successive selections of respective second input areas comprises, for at least one of the one or more successive selections of second input areas, receiving data indicating a drag input across one or more second input areas adjacent to the selected second input area, wherein the respective range consists of the one or more second input areas.

5. The system of claim 1,
wherein receiving, on the touch interface, second touch input data indicating a sequence of one or more successive selections of respective second input areas comprises, for at least one of the one or more successive selections of second input areas, receiving data indicating a dwell input towards from a given second input area, and wherein the respective range consists of the given second input area.

6. The method of claim 1,
wherein receiving, on the touch interface, second touch input data indicating a sequence of one or more successive selections of respective second input areas comprises, for at least one of the one or more successive selections of second input areas, receiving data indicating a drag input towards a particular input area and a lift input upwards from a given second input area, and wherein the respective range consists of the given second input area.

7. The system of claim 1,
wherein determining the word comprises determining a sequence of characters beginning with a first character corresponding to an input area from the first subset of input areas and followed by one or more second characters corresponding to a respective input area from each of the one or more second subsets of input areas.

8. The system of claim 1,
wherein determining the word comprises determining a sequence of characters, and wherein determining the sequence of characters comprises:
 determining a first character of the word, wherein determining the first character comprises selecting, from the first subset of input areas, a first input area that corresponds to the first character; and
 determining one or more second characters of the word, wherein determining the or more second characters comprises selecting, from each of the one or more second subsets of input areas, a respective second input area that corresponds to a second character.

9. The system of claim 1,
wherein selecting, from each of the one or more second subsets of input areas, a respective second input area that corresponds to a second character comprises determining that the character corresponding to the respective second input area has the highest prevalence of use among the characters corresponding to the input areas of the second subset of input areas.

10. The system of claim 1,
wherein determining the word comprises:
 assigning, to respective second input areas of the one or more second subsets, a respective probability ranking that is proportional to the distance from the selected second input area to each second input area of the range.

11. The system of claim 1,
wherein receiving, on the touch interface, second touch input data indicating a sequence of one or more successive selections of respective second input areas comprises receiving data indicating a drag input across between the second input area and a third input area, and wherein the second subset consists of the one or more input areas, and wherein determining the word comprises assigning, to respective second input areas of the one or more second subsets, a respective probability ranking that is proportional to the distance from the third input area to each second input area of the range.

12. The system of claim 1,
wherein the set of input areas comprises input areas that are aligned linearly in a one-dimensional arrangement.

13. The system of claim 1,
causing a visual depiction of at least one of the first subset or the one or more second subsets to be provided on a head-mountable graphical display.

14. The system of claim 1, further comprising
a frame supporting the head-mountable display, the frame comprising a first support and a second support that are perpendicular to the head-mountable display, wherein the touch interface is mounted to one of the first support or the second support.

15. A method comprising:
- providing, on a touch interface arranged on a head-mountable display such that the touch interface is outside of a wearer field-of-view when the head-mountable display is worn, a user-interface comprising a set of input areas, wherein each of the input areas is associated with a character from a set of characters;
- receiving, on the touch interface, first touch input data indicating a selection of a first input area from the set of input areas and a direction relative to the first input area;
- determining a first subset of input areas from the set of input areas, wherein the first subset includes a range of one or more adjacent input areas extending from the selected first input area in the indicated direction relative to the selected first input area;
- receiving, on the touch interface, second touch input data indicating a sequence of one or more successive selections of respective second input areas from the set of input areas and respective directions relative to each selected second input area, wherein each selected second input area is located to a first side of a previously selected second input area;
- determining one or more second subsets of input areas from the set of input areas, wherein each second subset includes a range extending from the selected second input area in the indicated direction relative to the second input area, wherein the range is exclusive of input areas that are located to a second side of previously selected second input area, and wherein the second side is opposite the first side;
- determining a word that includes respective characters corresponding to input areas within the first subset of input areas and the one or more second subsets of input areas; and
- causing a visual depiction of the determined word to be provided on a head-mountable graphical display.

16. The method of claim 15,
wherein the set of input areas extends linearly between two terminating input areas, and wherein receiving, on the touch interface, second touch input data indicating a sequence of one or more successive selections of respective second input areas comprises, for at least one of the one or more successive selections of second input areas, receiving data indicating a flick input towards a given terminating input area of the of the set of input areas, wherein the respective range consists of one or more second input areas between the selected second input area and the terminating input area.

17. The method of claim 15,
wherein receiving, on the touch interface, second touch input data indicating a sequence of one or more successive selections of respective second input areas comprises, for at least one of the one or more successive selections of second input areas, receiving data indicating a drag input across one or more second input areas adjacent to the selected second input area, wherein the respective range consists of the one or more second input areas.

18. The method of claim 15,
wherein receiving, on the touch interface, second touch input data indicating a sequence of one or more successive selections of respective second input areas comprises, for at least one of the one or more successive selections of second input areas, receiving data indicating a lift input upwards from a given second input area, and wherein the respective range consists of the given second input area.

19. A non-transitory computer-readable medium having stored thereon instructions executable by a computing device to cause the computing device to perform functions comprising:
- providing, on a touch interface arranged on a head-mountable display such that the touch interface is outside of a wearer field-of-view when the head-mountable display is worn, a user-interface comprising a set of input areas, wherein each of the input areas is associated with a character from a set of characters;
- receiving, on the touch interface, first touch input data indicating a selection of a first input area from the set of input areas and a direction relative to the first input area;
- determining a first subset of input areas from the set of input areas, wherein the first subset includes a range of one or more adjacent input areas extending from the selected first input area in the indicated direction relative to the selected first input area;
- receiving, on the touch interface, second touch input data indicating a sequence of one or more successive selections of respective second input areas from the set of input areas and respective directions relative to each selected second input area, wherein each selected second input area is located to a first side of a previously selected second input area;
- determining one or more second subsets of input areas from the set of input areas, wherein each second subset includes a range extending from the selected second input area in the indicated direction relative to the second input area, wherein the range is exclusive of input areas that are located to a second side of previously selected second input area, and wherein the second side is opposite the first side;
- determining a word that includes respective characters corresponding to input areas within the first subset of input areas and the one or more second subsets of input areas; and
- causing a visual depiction of the determined word to be provided on a head-mountable graphical display.

20. The non-transitory computer readable medium of claim 19,
wherein the set of input areas extends linearly between two terminating input areas, and wherein receiving, on the touch interface, second touch input data indicating a sequence of one or more successive selections of respective second input areas comprises, for at least one of the one or more successive selections of second input areas, receiving data indicating a flick input towards a given terminating input area of the of the set of input areas, wherein the respective range consists of one or more second input areas between the selected second input area and the terminating input area.

* * * * *